No. 823,276. PATENTED JUNE 12, 1906.
H. C. HERR.
MACHINE FOR FORMING CYLINDRICAL PACKAGES.
APPLICATION FILED JULY 11, 1904.

7 SHEETS—SHEET 1.

WITNESSES
Geo. H. Graves
Jas. T. Barry

INVENTOR
HENRY C. HERR
BY James Whittemore
ATTY.

No. 823,276. PATENTED JUNE 12, 1906.
H. C. HERR.
MACHINE FOR FORMING CYLINDRICAL PACKAGES.
APPLICATION FILED JULY 11, 1904.

7 SHEETS—SHEET 2.

WITNESSES
INVENTOR
HENRY C. HERR.
BY
ATT'Y.

No. 823,276. PATENTED JUNE 12, 1906.
H. C. HERR.
MACHINE FOR FORMING CYLINDRICAL PACKAGES.
APPLICATION FILED JULY 11, 1904.

7 SHEETS—SHEET 3.

WITNESSES
Geo. H. Graves
Jas. P. Barry

INVENTOR
HENRY C. HERR
BY James Whittemore
ATT'Y

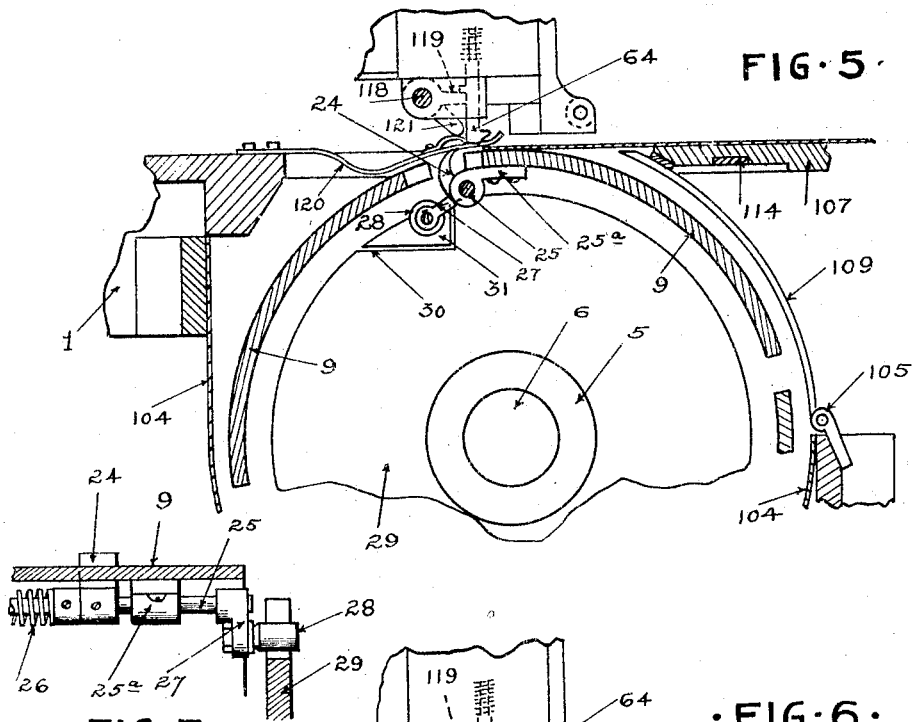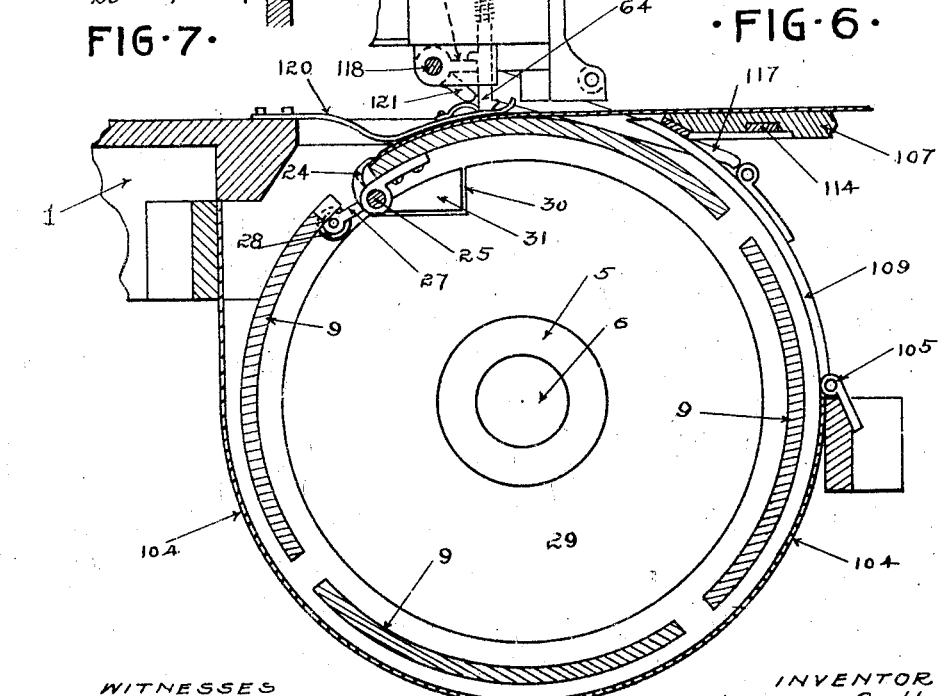

No. 823,276. PATENTED JUNE 12, 1906.
H. C. HERR.
MACHINE FOR FORMING CYLINDRICAL PACKAGES.
APPLICATION FILED JULY 11, 1904.

7 SHEETS—SHEET 5.

WITNESSES
Geo. F. Green
Jas. P. Barry

INVENTOR
HENRY C. HERR
BY James Whittemore
ATT'Y.

No. 823,276. PATENTED JUNE 12, 1906.
H. C. HERR.
MACHINE FOR FORMING CYLINDRICAL PACKAGES.
APPLICATION FILED JULY 11, 1904.
7 SHEETS—SHEET 6.
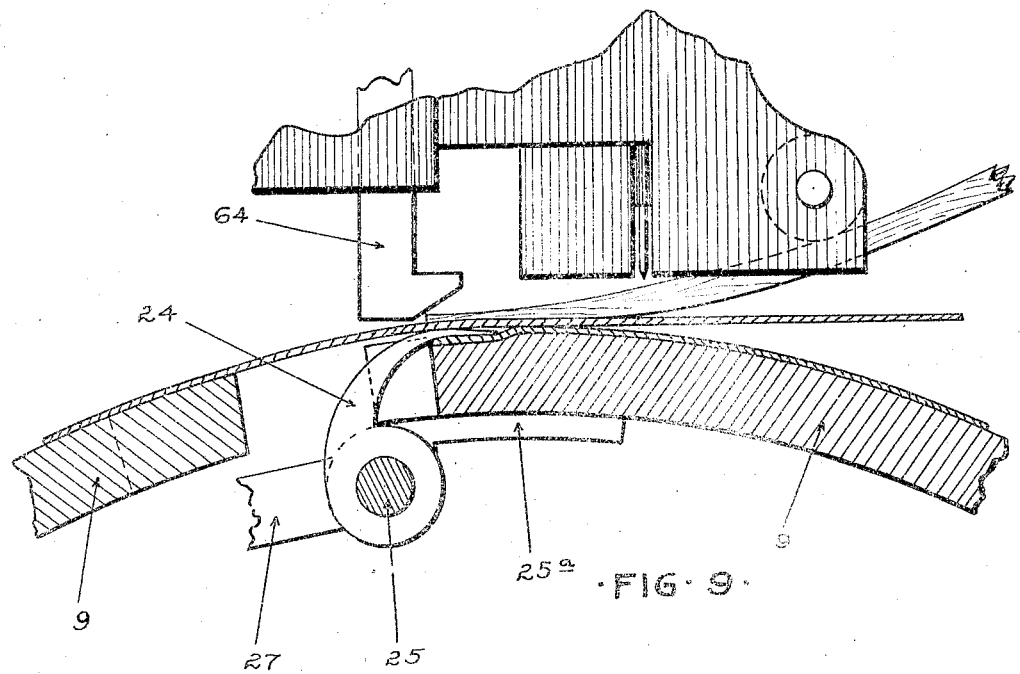
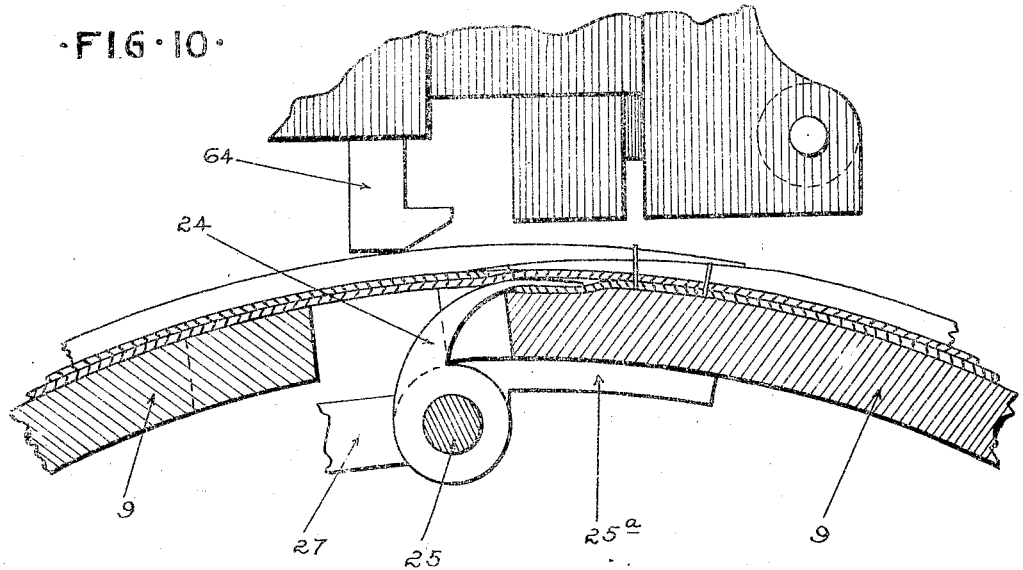
WITNESSES
INVENTOR
HENRY C. HERR.
BY
ATT'Y.

No. 823,276.
PATENTED JUNE 12. 1906.
H. C. HERR.
MACHINE FOR FORMING CYLINDRICAL PACKAGES.
APPLICATION FILED JULY 11, 1904.
7 SHEETS—SHEET 7.
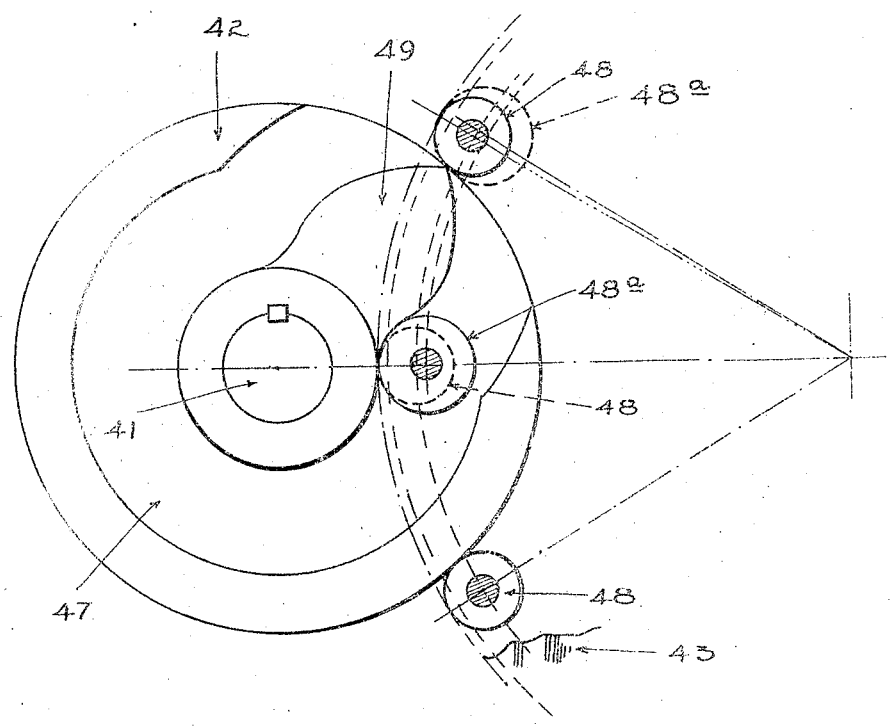
FIG. II.
WITNESSES
Geo. H. Graves
Jas. P. Barry
INVENTOR
HENRY·C·HERR·
BY
ATTY.

UNITED STATES PATENT OFFICE.

HENRY C. HERR, OF DETROIT, MICHIGAN.

MACHINE FOR FORMING CYLINDRICAL PACKAGES.

No. 823,276.  Specification of Letters Patent.  Patented June 12, 1906.

Application filed July 11, 1904. Serial No. 216,089.

*To all whom it may concern:*

Be it known that I, HENRY C. HERR, a citizen of the United States, residing at Detroit, in the county of Wayne and State of Michigan, have invented certain new and useful Improvements in Machines for Forming Cylindrical Packages, of which the following is a specification, reference being had therein to the accompanying drawings.

The invention relates to machines for manufacturing packages, and has more particular reference to a construction adapted for the production of a cylindrical package or barrel formed by winding thin sheets of material, such as paper.

The invention consists in the novel features of construction, as hereinafter set forth.

Figure 1:
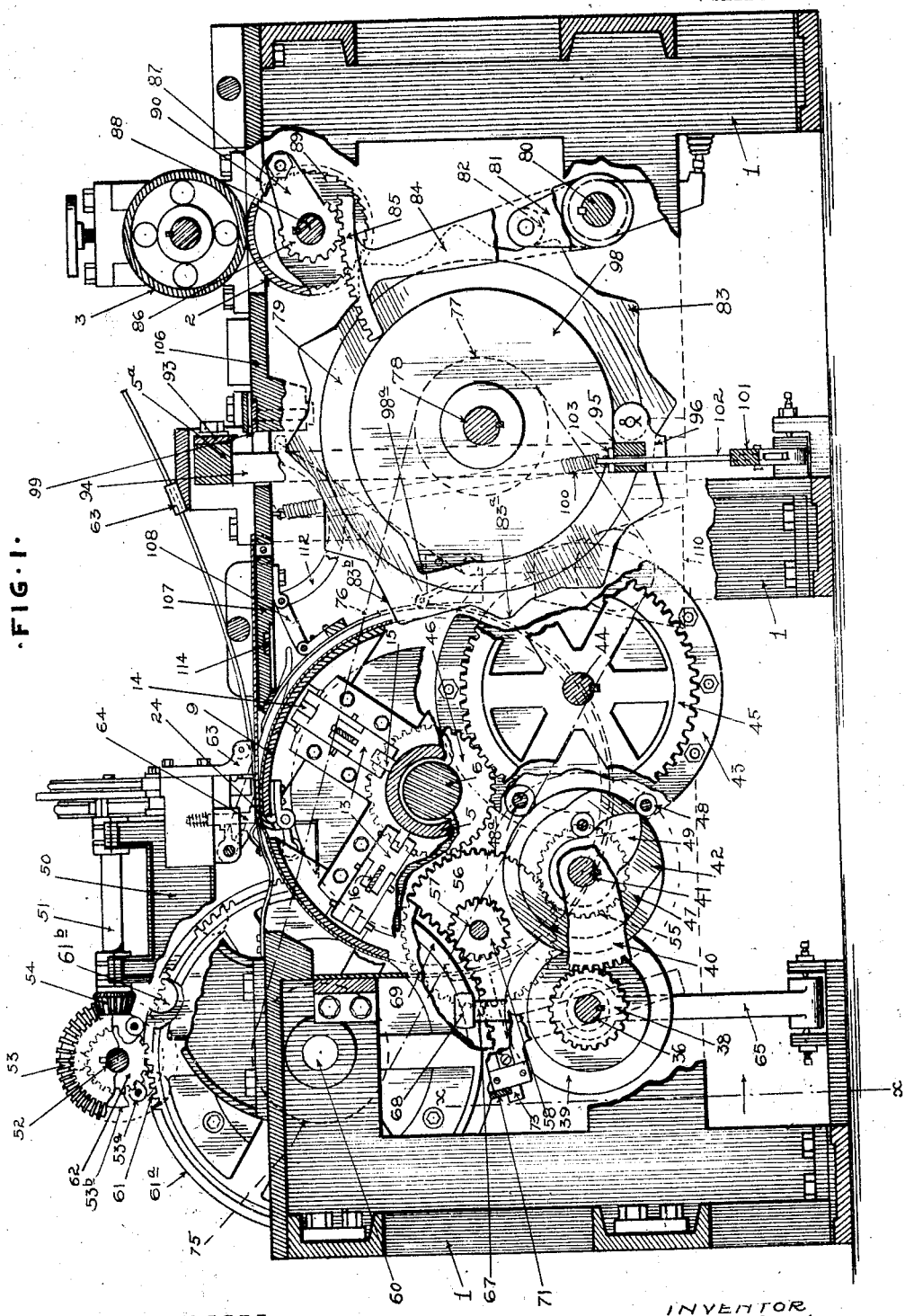
Figure 2:
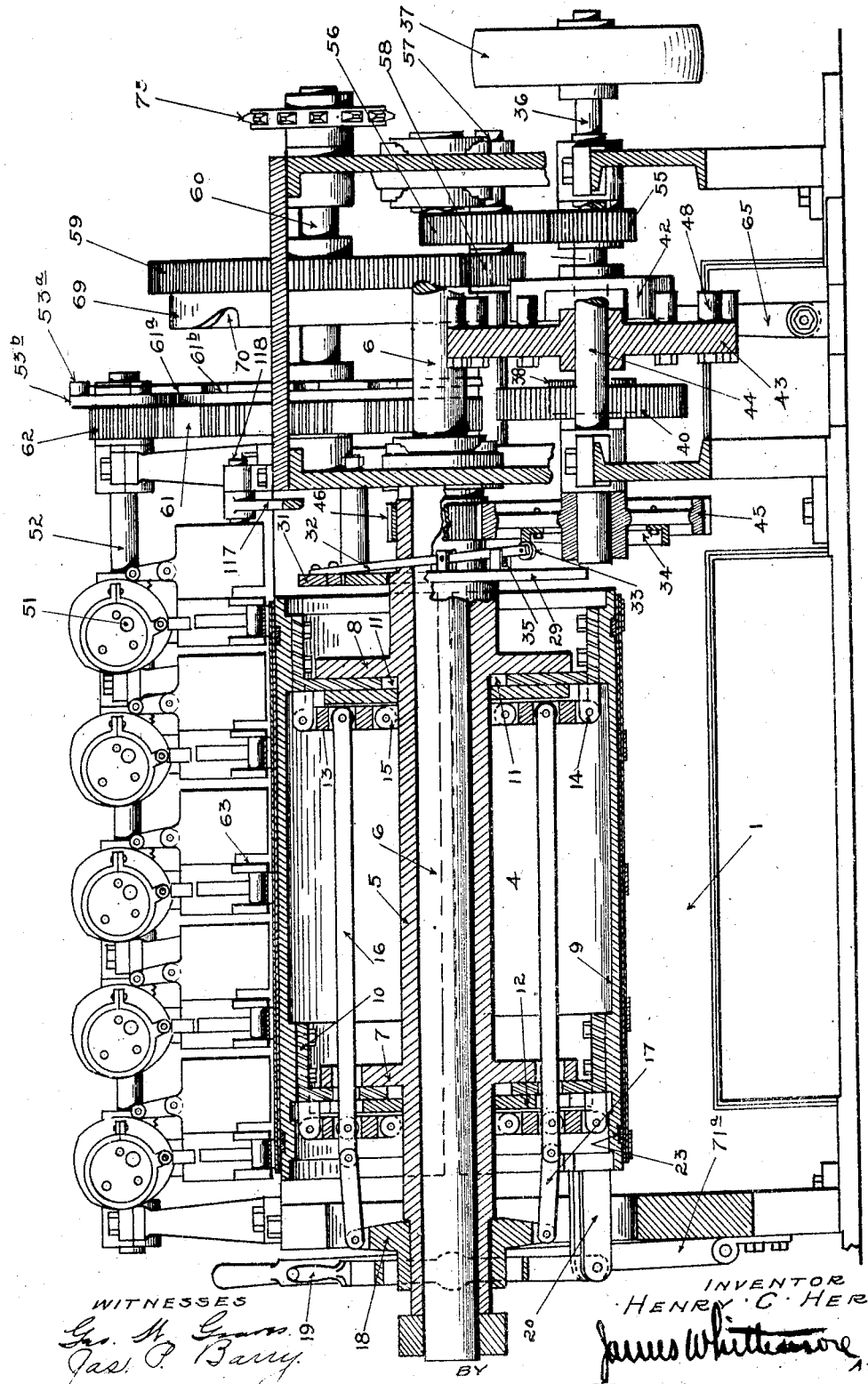
Figure 3:
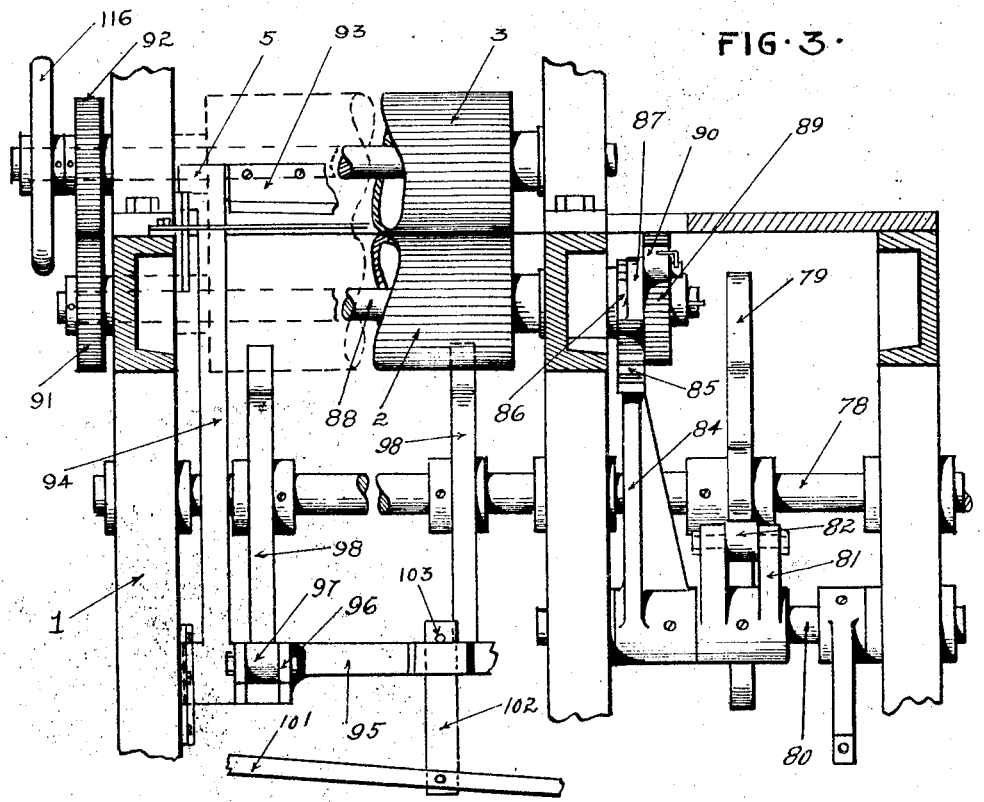
Figure 4:
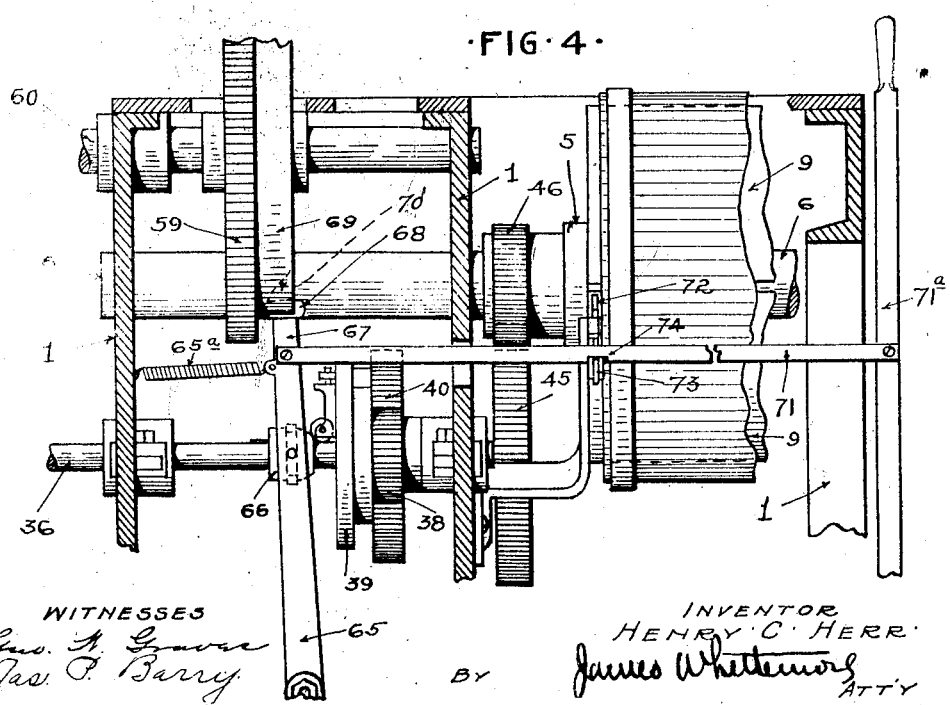
Figure 8:
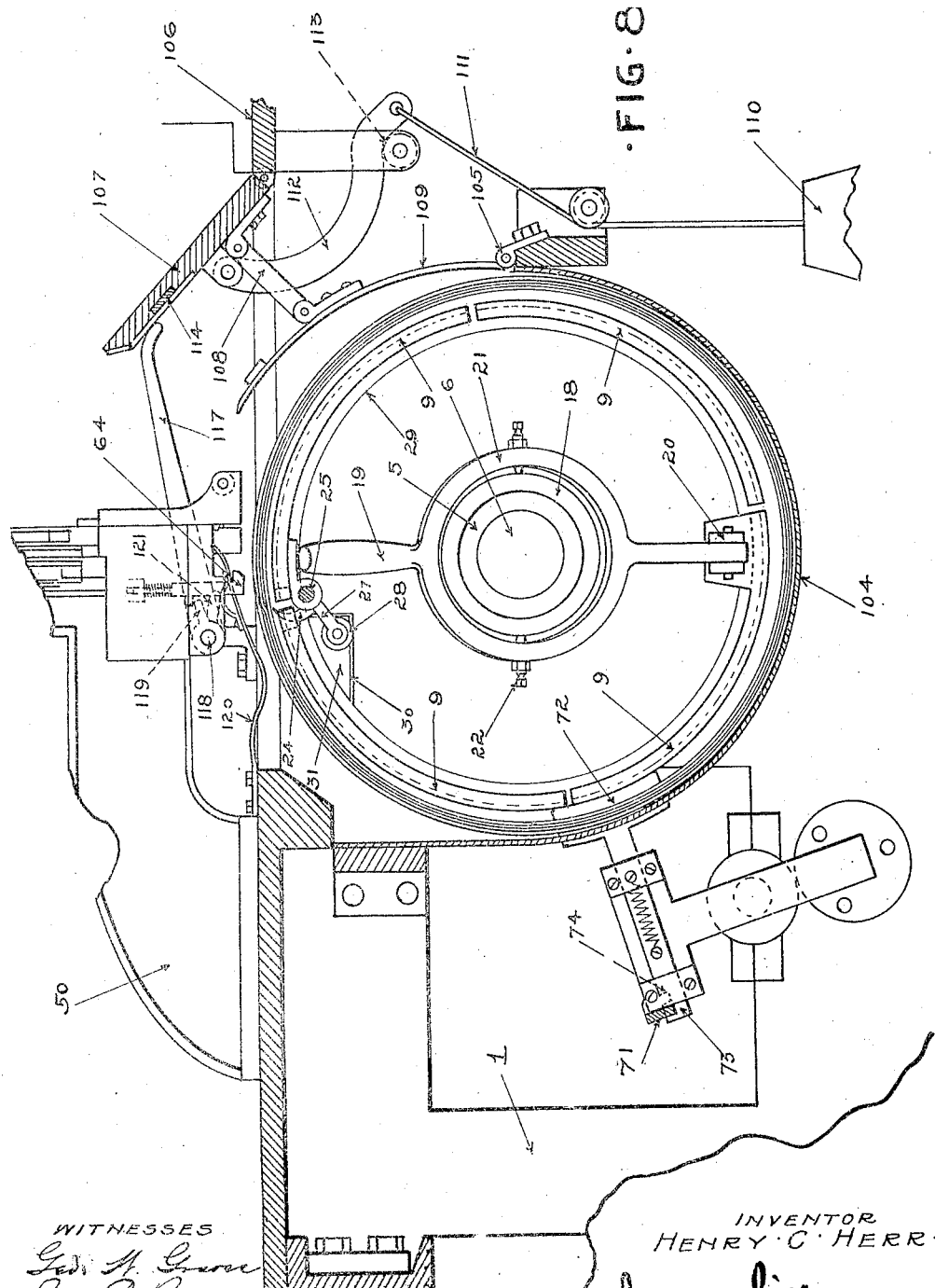

In the drawings, Figure 1 is a longitudinal section through the machine, having parts broken away to show the various gear-trains of the drive mechanism. Fig. 2 is a cross-section of the machine substantially in the plane of the axis of the winding-drum. Fig. 3 is a cross-section illustrating the feed mechanism. Fig. 4 is a cross-section substantially on line $x\,x$, Fig. 1, illustrating the starting-clutch and controlling mechanism. Fig. 5 is a section through the winding-drum illustrated in its initial position. Fig. 6 is a similar view showing the drum after the partial rotation. Fig. 7 is a longitudinal section through a portion of the drum, illustrating the working clips and the operating mechanism therefor. Fig. 8 is a view similar to Figs. 5 and 6, showing the drum collapsed and the parts in position for the removal of the completed package. Fig. 9 is an enlarged section of a portion of Fig. 1, showing the manner of engaging the hoops. Fig. 10 is a similar view after the completion of the package. Fig. 11 is a diagrammatic view illustrating the operation of the mechanism for intermittently rotating the drum.

Generally described, the machine comprises a collapsible drum or mandrel upon which the material is wound, together with means for intermittently rotating said drum to wind the paper, securing-hoops thereon, and a nailing or stapling mechanism operating during the intervals of rest of the drum to fasten the hoops. The machine also comprises a feed mechanism for the paper to the drum and an automatically-operated cut-off for severing the strip when the required amount has been fed.

1 is a suitable framework upon which is mounted a paper-feeding mechanism, comprising a pair of feed-rolls 2 and 3. These rolls are adapted to feed the web of paper over the top of the frame and into operative relation to the winding-drum 4, a cut-off mechanism $5^a$ being interposed between the rolls and the drum.

*Collapsible winding-drum.*—The winding-drum 4 preferably comprises a sleeve or tubular shaft 5, which is mounted upon a stationary shaft or axle 6.

7 and 8 are separated heads upon the sleeve 5, which, as shown, are of cross-shaped form.

9 represents drum-segments secured to inwardly-projecting brackets 10, which slidingly engage guideways 11 in the heads 7 and 8. As shown, these guideways are formed by detachable heads 12, which are secured to the heads 7 and 8 and are radially slotted for the reception of the inwardly-projecting shanks of the brackets 10.

13 represents toggle-levers which are secured at opposite ends to ears 14 and 15, respectively, on the brackets 10 and sleeve 5.

16 represents rods connecting the central pivots of the corresponding toggles adjacent to each of the heads 7 and 8, said rods being connected at one end by links 17 to a collar or head 18, slidingly secured on the sleeve 5.

19 is a lever fulcrumed at one end to a bearing 20, projecting from one of the segments 9 and having a central annular portion 21, which embraces the collar 18 and pivotally engages the same by means of the screws or pins 22.

With the construction above described the rods 16 may be moved longitudinally by shifting the lever 19 so as to either straighten or bend the toggle-levers 13. When said levers are straightened out, the segments 9 will be moved outward to expand the drum, which may, however, be collapsed at any time by the movement of the lever 19.

At opposite ends of the segments 9 and in the outer faces thereof are formed grooves 23, adapted to receive the inner hoops for the barrel or package, as will be hereinafter described.

*Winding mechanism.*—The machine may be adapted for the completion of a package with any number of plies of material; but as illustrated in the drawings it is constructed for the formation of a two-ply package. It is therefore necessary to revolve the drum through two complete revolutions to form the package; but a trip is provided for automatically arresting the movement after each revolution. This is to permit the engagement of the hoops prior to the winding of the last ply.

The end of the paper web is secured to the drum by means of a series of clips 24, secured to a rock-shaft 25, journaled in bearings upon one of the drum-segments 9.

26 is a torsional spring upon the shaft 25, tending to release the clips 24 to hold them in a position for receiving the edge of the paper strip. The clips are operated to clamp the strip by a rock-arm 27, carrying an antifriction-roll 28, which is adapted to engage with a circular track formed on the periphery of a head 29. This head is stationary and is secured to the frame so as to be arranged concentric with the axis of the drum-axle. In the initial position of parts the rock-arm 27 and roll 28 are in engagement with a recess or cut-away portion 30 of the head 29, so that the clips 24 are released by the tension of the spring. This will permit the end of the paper fed to the drum by the rolls 2 and 3 to be inserted beneath the clips. As soon, however, as movement is imparted to the drum the roll 28, mounting upon the periphery of the head 29, will clamp the edge of the paper against the segment 9.

To avoid releasing the paper at the end of the first revolution of the drum by the reëngagement of the roll 28 with the notch 30, a filling-block 31 is provided, together with means for inserting said block in the notch 30, so as to complete the circle of the head. As shown, the block 31 is attached to the free end of a lever 32, which is fulcrumed upon the head 29 and at its opposite end carries an antifriction-roll 33. This roll extends in the path of a rotary cam 34, which is secured, preferably, to one of the gear-wheels in the driving-train which rotates the drum. The arrangement is such that in the initial position of parts the cam 34, bearing against the roll 33, will move the lever 32, so as to withdraw the block 31 from the recess 30 in the head 29; but before the completion of the first revolution of the drum the cam will have moved out of engagement with the roll, so as to permit a spring 35 to actuate the lever and insert the block 31 into the recess 30. Upon the completion of a second revolution of the drum the cam 34 again actuates the lever to withdraw the block. This permits the roll 28 to reënter the notch, whereupon the spring 26 will actuate the clips 24 to release the paper.

The machine is designed not only to wind the paper upon the drum, but to also wind thereon the hoops and to secure said hoops to the paper by nailing or stapling. This stapling operation is performed during the intervals of rest of the drum, and to this end the drive mechanism for the drum is intermittent in its operation. It is also preferable that the drum should be arrested in its movement in exactly predetermined positions and that it should be locked from accidental movement during the operation of the stapling mechanism. This I have accomplished by a drive mechanism of the following construction: 36 is a main drive-shaft, which is journaled in suitable bearings and extends transversely of the frame 1, being provided with suitable drive connections, such as the pulley 37. 38 is a pinion sleeved upon the shaft 36 and adapted to be coupled thereto through the medium of a clutch 39. The pinion 38 meshes with a gear-wheel 40 upon a shaft 41, which shaft carries a cam-wheel 42 for coöperating with a pin-wheel 43 upon a shaft 44. 45 is a gear-wheel on the shaft 44, which meshes with a pinion 46 on the sleeve 5 of the collapsible drum 4. The cam-wheel 42 and pin-wheel 43 are so constructed that the constant rotation of the former will impart a step-by-step movement to the latter. This is accomplished by providing the wheel 42 with a groove 47, opening out through the periphery thereof and adapted to successively receive the pins 48 of the pin-wheel 43. The arrangement is such that when one of the pins is in engagement with the groove 47 the two adjacent pins of the wheel 43 will bear against the periphery of the wheel 42, thereby locking the wheel 43 and shaft 44 from movement. The wheel 42 is, however, provided with a cam portion 49, which ejects one pin from the groove 47, and at the same time the next succeeding pin is caused to enter the opposite end of said groove. This will cause the movement of the wheel 43 a distance equal to the space between two adjacent pins once in each revolution of the wheel 42, and during the intervals between these movements the wheel will be rigidly locked by the engagement of the pins with the periphery of the wheel 42.

The intermittent arrest of the drum is only necessary during the winding of the second ply of the material thereon, as the stapling only occurs at this time. I prefer, however, in order to avoid complications in the driving mechanism to impart an intermittent motion to the drum in both of its revolutions, and to this end the wheel 43 is provided with as many pins 48 as there are intervals of rest in the two revolutions of the drum. The gear-wheel 45 and pinion 46 are also proportioned two to one, so that the two revolutions of the drum are effected by a single revolution of the shaft 44.

The number of the intermittent movements in each revolution of the drum is determined by the number of staples which it is desired to drive into the hoops. As shown, the mechanism is such as to cause six stops in each revolution of the drum, which is accomplished by providing twelve pins on the wheel 43. If these pins were uniformly spaced and of equal size, it is evident that the starting position and the stopping position of the drum at the beginning and end of each revolution would be precisely the same, and as the stapling mechanism is in fixed position this would result in driving two staples in the same place. This difficulty is avoided by making one of the twelve movements of the wheel 43 of greater degree than the other eleven. This overmovement is the sixth in the series from the beginning of the winding of the drum, and its effect is to arrest the drum at the end of its first revolution in a position slightly beyond that initially occupied. The overmovement is, however, compensated for by a diminished movement of each of the other eleven, so that when the twelve movements have been completed the drum will be arrested at the end of its second revolution in precisely its initial position.

The overmovement of the wheel 43 is accomplished by making one of the pins 48$^a$ of larger diameter than the other eleven. The pins are all arranged upon the wheel 43 in radial lines which are equidistant from each other; but the large pin 48$^a$ is positioned slightly nearer the axis of the wheel than the others. The result is that this large pin will engage with the periphery of the wheel 42 to effect the locking of the wheel 43 in precisely the same manner as all of the other pins, but when said large pin enters the groove 47 the cam 49 in ejecting the pin will cause the overmovement by reason of the larger diameter, as illustrated in Fig. 11.

The stapling mechanism may be of any desired construction, and as the specific construction employed forms no part of the present invention it will not be described in detail. In general, a series of staplers is provided, the number being equal to the number of hoops which are to be secured around the package, and as shown five of such devices are provided. Each of these stapling mechanisms is secured to a bracket 50, mounted upon the frame 1 and so arranged that the staple when driven will be slightly in advance of the vertical plane of the axis of the drum. Each stapling mechanism is actuated by a revoluble shaft 51, and these shafts are geared to a common driven shaft 52 through the medium of the bevel gear-wheels 53 and 54. The shaft 52 extends transversely of the frame and is intermittently actuated through a gear-train of the following construction:

The shaft 41 has mounted thereon in addition to the gear-wheel 40 and cam-wheel 42 a gear-wheel 55. This wheel meshes with a gear 56 upon a shaft 57, upon which is a pinion 58, meshing with a large gear-wheel 59 on a shaft 60. Upon this shaft 60 is also mounted a mutilated gear-wheel 61, each of the toothed sections of which is adapted to mesh with a pinion 62 upon the shaft 52. Thus rotary motion is communicated constantly from the shaft 41 to the shaft 60 and intermittently from the latter shaft to the shaft 52, the timing being such that the shaft 52 is only driven during intervals of rest of the drum 4. Moreover, the shaft 52 is only actuated during seven of the twelve periods of rest of the drum in its two revolutions, the first of these periods being after the completion of the first revolution and the last after the completion of the second revolution of the drum. This will result in driving seven staples in each hoop, the first and last staples being adjacent to each other, but spaced by a distance equal to the overmovement of the drum when actuated by the large pin 48$^a$.

In order that the stapling mechanisms and their common drive-shaft 52 may be locked from movement intermediate each actuation, I preferably provide a locking mechanism of the following construction: 53$^a$ represents pins projecting from a rotary head 53$^b$ adjacent to the pinion 62 and so arranged that a pair of said pins will travel in contact with the periphery of a rotary head or disk 61$^a$, mounted on and rotating adjacent to the mutilated gear 61. This disk 61$^a$ has formed therein pockets 61$^b$, one of which registers with one of the pins 53$^a$ whenever one of the toothed segments of the mutilated gear engages with the pinion 62. Thus the rotation of said pinion is permitted, the pin 53$^a$ passing around in engagement with the pocket 61$^b$, and as soon as disengaged from said pocket said pins 53$^a$ will again come in contact with the periphery of the disk 61$^a$ and will lock the shaft 52 from rotation until another toothed segment engages with the pinion 62.

The hoops are guided in the machine by arranging suitable guide-flanges 63 on the frame 1, and the forward ends of the hoops are positioned on the drum by engaging with yielding gage stops 64. The distance between the gage-stops 64 and the point at which the staple is driven is substantially equal to the length of the bevel portion of the hoop, so that the first staple will be driven in a portion of the hoop almost a full thickness.

As has been said, an automatic trip has been provided for disengaging the clutch 39 at the end of each revolution of the drum, this clutch being engaged by a hand operation. The timing of the disengagement is such that movement of the gear-trains is arrested just after the last intermittent movement of the drum and just preceding the intermittent actuation of the shaft 52 and stapling mechanism actuated thereby. As a consequence when the machine is again set in motion the first operation will be that of the stapling mechanisms, which will drive staples in each of the hoops, securing the same to the two plies of paper upon the drum. In the following movements staples will be driven at each point of rest of the drum until the second revolution is completed, whereupon the last staple will be driven in the opposite end of the hoop adjacent to the first staple.

The tripping of the clutch 39 is preferably accomplished by the following mechanism: 65 is a lever or rock-arm fulcrumed near the base of the frame 1 and embracing the shaft 36. 66 is a sliding collar upon the shaft 36, with which the lever 65 engages. 67 is an upward projection on the lever 65, carrying an antifriction-roll 68, which is adapted to engage with a flange 69, secured to the gear-wheel 59. This flange 69 has formed therein at one point a notch or depression 70, adapted to receive the roll 68 and permit the movement of the lever 65 and a corresponding sliding of the collar 66 upon the shaft 36. The sliding collar 66 is an actuating member for the clutch 39, the detail construction of which is not illustrated, and the arrangement is such that whenever the roll 68 is in a notch 70 of the flange 69 the clutch will be released, thereby stopping movement of the gear-trains. The engagement of the clutch is effected by the movement of a pull-rod 71, actuated by a lever 71ª, which is connected to the lever 65 and is adapted to move said lever, so as to withdraw the roll 68 from the notch and move the collar 66 into position for engaging the clutch. As soon as this is accomplished movement of the gear-trains will cause the withdrawal of the notch 70 from the path of the roll 68, with the result that the flange 69 will hold said roll and the lever 65 from movement until the drum has completed one revolution. As shown, the shaft 60 makes one revolution to each two revolutions of the drum, and the flange 69 is therefore provided with two of the notches 70 on opposite sides thereof.

To prevent the starting of the mechanism when the drum is in collapsed position for the removal of the completed package, an automatic lock is preferably provided for the pull-rod 71. This, as shown, consists of a spring-pressed shoe 72, which bears upon the drum at one end thereof beyond the portion on which the paper is wound. The shank 73 of this shoe is adapted to engage with the stop or shoulder 74; but when the drum is expanded the shank is held in such a position as to be disengaged from said shoulder. The result is that the pull-rod 71 may be actuated whenever the drum is expanded; but in collapsed position movement of the shoe under the actuation of its spring will cause the engagement of the shank 73 with the shoulder 74 and lock the rod from movement.

It has been stated that the paper web which is wound upon the drum is fed thereto by the rolls 2 and 3. These rolls are intermittently actuated by mechanism of the following construction: 75 is a sprocket-wheel upon the shaft 60, which is connected by a chain 76 with a sprocket-wheel 77 on a shaft 78, extending transversely of the frame. This shaft has mounted thereon a cam-wheel 79, which has a series of actuating portions corresponding to a series of actuating-pins upon the wheel 43—i. e., in the construction shown there are twelve actuating projections upon the cam-wheel 79. 80 is a shaft upon which is mounted a rock-arm 81, carrying at its free end an antifriction-roll 82, bearing against the periphery of the cam 79, the arrangement being such that in the rotation of said cam the arm 81 will be successively rocked by the passage of each of the projections. Ten of these projections 83 are of uniform size, and consequently impart an equal movement to the rock-arm 81. The two other projections 83ª and 83ᵇ are respectively smaller and larger than the uniform projections and are adjacent to each other, the effect being to rock the arm 81 through a smaller and a larger angle than its normal movement. Upon the shaft 80 is also mounted an arm 84, carrying at its outer end a gear-segment 85. This gear-segment is in mesh with a gear-segment 86 on a rock-arm 87, sleeved upon a rock-shaft 88. The rock-shaft 88 passes axially through the roll 2, which is mounted thereon. 89 is a ratchet-wheel secured to the shaft, and 90 is a spring-actuated pawl pivotally attached to the rock-arm 87 and engaging with said ratchet-wheel. The arrangement is such that every time the rock-arm 81 is actuated by one of the projections on the cam-wheel 79 it will cause the gear-segment 85 on the rock-arm 84 to actuate the gear-segment 86 on the rock-arm 87, and the latter through the medium of the pawl 90 will actuate the ratchet-wheel 89 and rotate the roll 2. At the opposite end of the roll 2 is a gear-wheel 91, intermeshing with a gear-wheel 92 on the roll 3, so that whenever the roll 2 is actuated a corresponding movement is imparted to the roll 3.

The uniform projections 83 on the cam 79 will cause an equal rotation of the rolls 2 and 3, resulting in a uniform feeding of the paper, and the amount of paper thus fed is just equal to the amount required to supply the drum in its normal movement between the staples. The small cam projection 83ª will cause a lesser feed than normal, and this is for the purpose of separating the severed edges of the paper strip after the operation of the cutter, so that the feeding of the web will not interfere with the final operation of completing the package, and also to provide clearance for the ready removal of the package when completed. This short feed is compensated for at the beginning of the succeeding operation by the overfeed caused by the large cam projection 83ᵇ.

In order that the end of the paper strip may be engaged with the clips in advance of the rotation of the drum, the cam 79 is so timed in relation to the actuating-cam for the drum that the feed-rolls 2 and 3 will always start in advance of the movement of the drum and correspondingly stop slightly in advance of the stopping of the drum. The effect of this is to always supply slack in the paper-strip during the winding of the same on the drum; but at the end of each partial winding this slack is taken out and a sufficient tension placed on the strip to draw it taut on the drum.

The cut-off mechanism 5ª preferably consists of a transverse cutter-blade 93, secured to a vertically-sliding frame 94, secured in bearings in the frame 1. At the lower end of the frame 94 is a cross member 95, having bearings 96 for the antifriction-rolls 97.

98 represents cams mounted upon the shaft 78, which are adapted once in the revolution of each to actuate the knife-frame 94 downward by the engagement of projections 98ª with the antifriction-rolls 97. This will cause the knife-blade 93 in coöperation with a stationary blade 99 to sever the paper strip. As soon as the cam has effected this operation the blade 94 will be returned by the actuation of a spring 100, which draws the frame 94 upward.

In order that the cutter may be operated to sever the strip—as, for example, where the machine is started in operation and there is an uneven edge to the paper—an independently-operated mechanism is provided. This consists of a foot-lever 101, connected by a link 102 with the frame 94. The link 102 is in the form of a rod which passes through the cross-bar 95 of the frame and has a pin 103 for engaging said bar, the reëngagement being such that the normal operation of the cutter by the cam is permitted without operating the foot-lever, while at the same time the construction is such that the cutter may be independently operated at any time through the medium of the foot-lever.

The drum 4 is preferably surrounded by a shield or casing 104, which is sufficiently spaced from the drum to permit the winding of the paper and hoops thereon. This casing serves to hold the completed package from dropping down when the drum 4 is collapsed, and thus the withdrawal of the package from the drum is facilitated. To permit of more ready access to the drum, the segment of this casing 104 is hinged at 105 and is capable of being thrown back to disclose the upper portion of the drum. The table 106, over which the paper is fed from the rolls 2 and 3 to the drum, is also provided with a hinged section 107, and this hinged section 107 is connected by a link 108 with a hinged segment 109 of the shield. The construction is such that the raising of the hinged section of the table will draw with it the hinged segment 109 of the shield, so as to give free acess to the drum. The movement of these parts is facilitated by a counterweight 110, which is actuated by a flexible connection 111 with the end of a segmental arm 112. This arm is supported on an antifriction-roll in a bracket 113, depending from the table 106, and the opposite end of said arm is pivotally attached to the hinged section 107 of the table, so that the pull exerted by the weight 110 tends to lift the hinged table-section. The parts are normally held in locked position by a locking-rod 114, which may be of any suitable construction.

The parts constructed as shown and described, the general operation of the mechanism is as follows: In the initial position of parts the drum 4 is in its expanded position and the clips 24 are held in a position slightly in rear of the vertical axial plane of the drum. At this point the clips are released by reason of the rolls 28 engaging with the notch 30 in the heads 29. The operator first passes the end of the paper strip between the feed-rolls 2 and 3, which may be independently rotated by means of a hand-wheel 116. Before the end of the web is passed to the drum the cutter 5ª is preferably actuated through the medium of the foot-lever 101, so as to obtain a perfectly true edge at the end of the strip for engagement with the clips. The strip is then fed forward until its end is in proximity to the clips 24. The operator next sets the mechanism in operation by drawing upon the rod 71 through the hand lever 71ª. This will cause the movement of the clutch 39, so as to couple the pinion 38 with the shaft 36, thereby causing the operation of the gear-trains. Motion is thus communicated from the pinion 38 through the gear 40, shaft 41, cam 42, pin-wheel 43, shaft 44, gear-wheel 45, and pinion 46 to the drum 4, which travels through the first segment of its rotation. Simultaneously with the movement of this train motion is transmitted from the shaft 41 through the gear-wheels 55 and 56 to the shaft 57 and from the latter through the pinion 58, gear-wheel 59, shaft 60, sprocket-wheel 75, chain 76, and sprocket 77 to the shaft 78, which actuates the cam 79. As has been said, this cam in its initial position is so arranged that the roll 82 on the rock-arm 81 is between the projection 83ª and the projection 83ᵇ of the cam, so that as soon as motion is imparted to the cam through the train said projection 83ᵇ will immediately actuate the rock-arm 81, and through the shaft 80, rock-arm 84, segment 85, segment 86, rock-arm 87, pawl 90, ratchet-wheel 89, and shaft 88 will cause the rotation of the feed-rolls 2 and 3. This will feed the paper strip, movement being imparted to the latter before the initial movement of the drum, and thereby advancing the end of the strip into a position where it engages with the pin-clips 24. As soon as thus engaged, the drum will begin to rotate, the paper moving with it under the actuation of the feed-rolls until the roll 28 mounts upon the periphery of the head 29 and rocks the shaft 25 to clamp the clips 24 upon the paper. The drum will then continue its movement until the completion of the first segment; but the feed of the rolls 2 and 3 will be arrested slightly in advance of the arrest of the drum, so as to tension the paper. These movements will be repeated until the drum 4 has been moved through the first revolution, the last segment of which is of greater degree than the others, so that a little more than a complete revolution is effected, as has been previously described. During these operations the movement of the shaft 60 has actuated the mutilated gear-wheel 61, so as to bring the first toothed segment of the latter into a position for engagement with the pinion 62. Before such engagement, however, movement of the gear-trains is arrested by the engagement of the roll 68 on the lever 65 with the notch 70 in the flange 69. Before the operator again imparts movement to the mechanism by the actuation of the lever 71$^a$ the hoops are inserted in position in engagement with the guides 63 and with their forward ends abutting against the stops 64. Thus when movement is again imparted to the trains the first operation will be the stapling of each of the hoops to attach it to the paper wound upon the drum. When thus secured, movement will be again imparted to the drum and the operations repeated in the same manner as during the first rotation, with the exception that during each interval of rest of the drum the stapling mechanisms will be operated to staple the hoops to the paper. During the final revolution of the drum the movement of the shaft 78 will actuate the cams 98, so as to engage the rolls 97 on the cutter-frame 94 and actuate the cutter 93. The timing is such that the required length of paper is fed before severing takes place. When the rotation of the drum is finally completed, the rear end of the paper strip will be arranged adjacent to the forward end thereof upon the drum, being preferably slightly spaced, so as to prevent overlapping. This will permit the paper wound upon the drum to assume the shape of a true cylinder, the connecting-ply being bent between the separated ends of the paper. The final operation of the mechanism is the driving of the staple which secures the beveled ends of the hoop upon the beveled forward ends thereof, the last staple being separated from the first staple driven, as has been previously described. The package having thus been completed, it is only necessary to collapse the drum in order that it may be removed therefrom. This collapsing is effected by the movement of the lever 19, which, as has been described, actuates the toggles to draw in the segments 9. During this inward movement of the segments the shaft 25, upon which the clips 24 are mounted, will also be carried inward, which will permit said clips to disengage from between the plies of paper, so as to free the package from the drum. After the collapsing of the drum the package will rest upon the shield 104, which will disengage the inner hoops from the channels 23, so as to permit of endwise movement of the cylinder in disengagement.

In order to provide greater freedom for the removal of the package from the collapsed drum, the hinged segment 107 of the table is preferably thrown up and through its connection by the link 108 with the segment 109 of the shield the latter is also thrown outward. I preferably, also, provide connections by which the stops 64 are automatically lifted simultaneously with the lifting of the hinged section 107. As shown, this comprises a lever 117 on a rock-shaft 118, on which is mounted a series of rock-arms 119. Each of the rock-arms 119 engages with one of the stops 64, the arrangement being such that during the rocking of the shaft 118 the stops 119 will be lifted. The rock-shaft 118 is preferably actuated by springs 120, which operate whenever the downward pressure on the lever 117 is relieved by the lifting of the hinged section 107. These springs 120 are preferably arranged to form guides for the paper strip during its initial movement in winding upon the drum, and for this purpose said springs are formed with segmental portions, normally arranged concentric with the drum. The tension of the springs, however, tends to throw them upward from the drum and there hold them in normal position through the engagement therewith of rock-arms 121, mounted upon the shaft 118. Thus in the normal position of parts, where the hinged table-section 107 is in horizontal position, the springs 120 will be forced downward, so as to be arranged concentric with the drum and in position to guide the forward edge of the paper during its first winding movement. The lifting of the section 107 will permit the tension of the springs 120 to move the arms 121 upward, thereby rocking the shaft 118 and lifting the stops 64, as previously described.

It is to be observed that the construction of gage-stops for the hoops is such that the operator after first starting the machine may begin to place the hoops in position, the stops holding them from movement until the first staples are driven. After the driving of the first staple the gage-stops will be moved upward out of the path of the hoop, this being permitted by the spring-support and the beveled face, as clearly shown in Fig. 9. Thus considerable time is saved which would be necessarily consumed in placing the hoops if this operation could only be performed after the stopping of the drum.

The inside hoops are placed in position by hand when the drum is collapsed and engage with the grooves 23.

What I claim as my invention is—

1. The combination with a drum, means for intermittently partially rotating said drum, an intermittent feed mechanism for supplying to said drum the material for each partial rotation, means whereby said feed mechanism is timed to start and stop, respectively in advance of the starting and stopping of said drum.

2. The combination with a drum, means for intermittently partially rotating said drum, an intermittently-operated feed mechanism for supplying the material to said drum for each partial rotation thereof, means intermediate said feed mechanism and drum for periodically severing the material, and means for temporarily retarding the feed after the severing of the material, to separate the severed edges.

3. The combination with a drum, means for intermittently partially revolving said drum, of an intermittently-operated feed mechanism for supplying the material to said drum for each partial rotation thereof, means whereby said feed mechanism is timed to slacken the tension of the material during winding, and to draw the material taut at the end of each winding movement.

4. The combination with an intermittently-rotating winding-drum, of a nailing mechanism, means of timing the same to operate during intervals of rest of said drum, and a common drive mechanism for the winding and nailing mechanism, and means for stopping said drive mechanism at a point between the completion of the partial rotation of said drum and the succeeding operation of the nailing mechanism, whereby upon the restarting of said drive mechanism, said nailing mechanism will be operated in advance of the rotation of said drum.

5. The combination with an intermittently-rotating winding-drum, of a nailing mechanism, means of timing the same to operate during intervals of rest of said drum, a common drive mechanism for operating said intermittent drum and nailing mechanism, a clutch controlling said common drive, a trip operated by the completion of a rotation of said winding-drum to release said clutch and arrest movement of said common drive, the point at which said mechanism is arrested being between the completion of the partial rotation of said drum, and the next succeeding operation of the nailing mechanism.

6. The combination with an intermittently-operated winding-drum, of a nailing mechanism, of a guide for holding the hoop in relation to said nailing mechanism, a common drive mechanism for said winding-drum and nailing mechanism, means for arresting movement of said common drive after the winding of the ply to permit of the engagement of the hoop with its guide, the point of arrest being between the completion of the partial movement of the drum and the succeeding nailing operation, whereby the initial operation on restarting is the nailing of the hoop.

7. The combination with a winding-drum, means for rotating the same through a plurality of complete revolutions and means for arresting the movement of said drum at predetermined points of the work-holding clip carried by said drum, an actuating-arm for said clip, a stationary cam-track around which said arm travels in the rotation of said drum to hold the clip in clamping engagement, said track being cut away to permit the disengagement of said clip in the position of rest of said drum, and means for completing the cut-away portion of said track between successive revolutions of the drum.

8. A collapsible winding-drum comprising an arbor, separated heads thereon, drum-segments engaging radial guides on said heads and movable thereon, toggle-levers connected to said segments and heads, longitudinally-extending rods connecting the knuckles of said toggles, a collar longitudinally slidable on said arbor, links connecting the said longitudinal rods with said collar, and a lever fulcrumed on one of said segments and embracing and having a pivotal engagement with said collar for collapsing said drum, said lever being included within the circle of said drum, whereby the work may be passed over said lever when removed from said drum.

9. The combination with a collapsible winding-drum having annular grooves to receive inside hoops of the package, of a shield surrounding said drum and substantially concentric therewith adapted to support the package when the drum is collapsed and hold the hoops out of engagement with said grooves, so as to permit of the longitudinal withdrawal of the package.

10. A collapsible winding-drum comprising an arbor, separated heads thereon, drum-segments engaging radial guides on said heads and movable thereon, toggle-levers connected to said segments and heads, rods connecting the knuckles of said toggles, a collar longitudinally slidable on said arbor, links connecting said rods with said collar, and a lever for collapsing and expanding said drum, fulcrumed on one of said segments and pivotally engaging said collar and included within the circle of said segments, said lever being entirely supported on and rotating with said segments and collar.

11. The combination with a collapsible winding-drum, and a table over which the material is fed to said drum, of a shield surrounding said drum and concentric therewith, having a hinged segment and said table having a hinged section and a connection between said table-section and hinged segment whereby the swinging of the one will actuate the other.

12. The combination with a winding-drum, of a yielding guide for the work at the point of engagement with said drum, a movable shield inclosing said drum, and means between said shield and guide holding the latter in its guiding position, whereby the removal of said shield from the work will permit the automatic withdrawal of said guide, for the purpose described.

13. The combination with a winding-drum and a movable shield inclosing said drum, of guides for the web of the work and gage-stops for the hoops at the point of engagement with said drum, means operating to hold said guide and gage-stops in operative position, and means operating on the removal of said shield to withdraw said guides and gage-stops out of engagement with the work, for the purpose described.

14. The combination with a winding-drum, of a plurality of guides for the work at its point of engagement with said drum, a removable shield for the drum, a removable work-supporting table, a lock therefor, means operated to hold said shield and guides in operative position, and automatic means operating on the release of said table, whereby said table, shield and guides are withdrawn from said work.

15. The combination with a collapsible winding-drum and mechanism for driving same, of a clutch for coupling said winding-drum with its drive mechanism, and means operated by the collapse of said drum for locking said clutch in its released position.

16. The combination with a winding-drum, of mechanism for intermittently rotating said drum through a plurality of revolutions by a series of partial revolutions which are of substantially equal lengths, one of said partial revolutions being slightly longer than the others, but the sum of said series being equal to an exact number of complete revolutions, and means for arresting said rotating mechanism to stop said drum alternately at points out of and in coincidence with its initial position.

17. The combination with a winding-drum and a nailing mechanism, of a gage-stop to position the hoop in relation to the winding-drum and nailing mechanism, yielding means holding said stop in the path of the hoop and permitting said hoop to push said stop out of the said path after the nailing of said hoop, and means for moving said yielding means and said stop to withdraw the latter from engagement with the work.

18. The combination with a winding-drum and a continuously-operating driving means, of connecting means therebetween operating to rotate said drum intermittently through a plurality of partial revolutions and means for automatically disconnecting said drum from said driving means, said disconnecting means operating to leave said drum alternately at points out of incidence and in coincidence with the initial position of said drum, for the purpose described.

19. The combination with a winding-drum and a continuously-operating driving means, of connecting means therebetween operating to rotate said drum intermittently through a plurality of partial revolutions, means for locking said drum from movement between said partial revolutions, and means for automatically disconnecting said drum from said driving means alternately at points out of incidence and in coincidence with the initial position of said drum.

In testimony whereof I affix my signature in presence of two witnesses.

HENRY C. HERR.

Witnesses:
 JAS. P. BARRY,
 E. D. AULT.